Aug. 24, 1943.  W. H. MACHIN  2,327,728
TRIPOD AND OTHER CONSTRUCTIONS
Filed Oct. 31, 1941
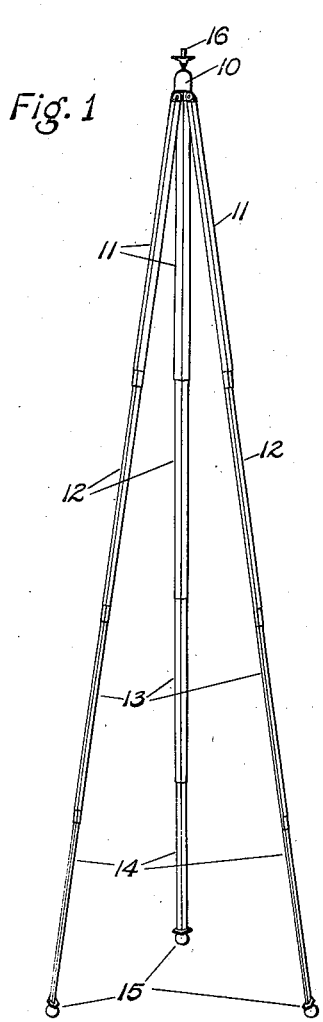
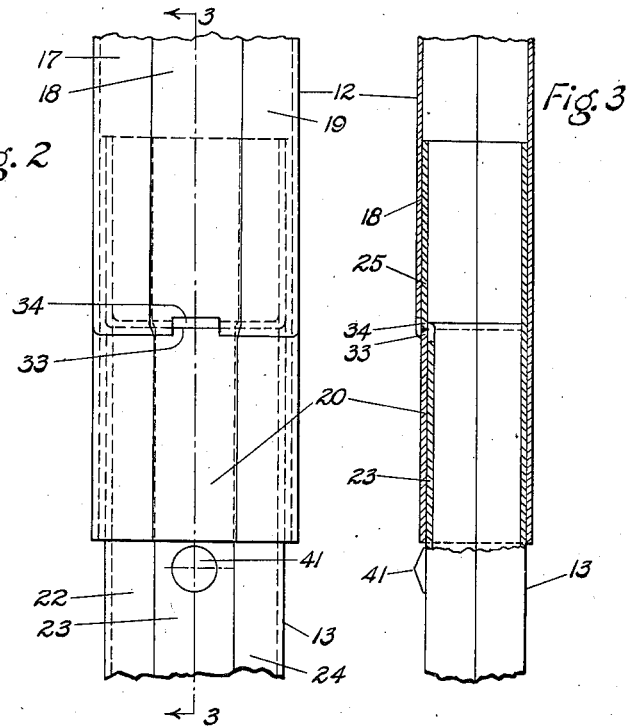
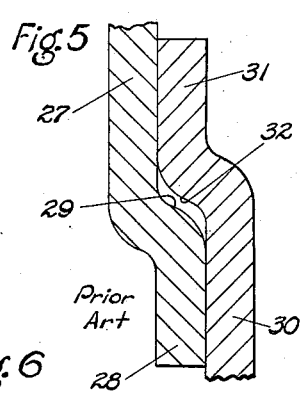
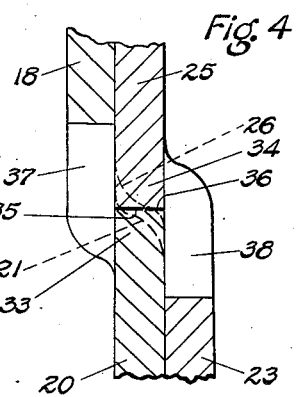
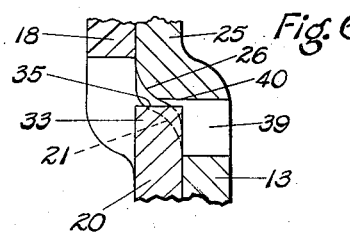
Willis Henry Machin
INVENTOR
BY
ATTORNEY Patented Aug. 24, 1943

2,327,728

UNITED STATES PATENT OFFICE 2,327,728

TRIPOD AND OTHER CONSTRUCTIONS

Willis Henry Machin, Middlebury, Conn., assignor, by mesne assignments, to General Aniline & Film Corporation, New York, N. Y., a corporation of Delaware Application October 31, 1941, Serial No. 417,371

5 Claims. (Cl. 248—191)

This application involves an improved tripod construction and more particularly a new and improved stop means for limiting the outward extension of the telescoping legs in such a tripod.

Tripods are well known in the photographic and other fields in which the tripod includes a head with screw or similar means for attachment to a camera or other instrument, and with a plurality of extendable legs usually formed of telescoping tubular sections. In one form of such tripod the outer or larger tubular section is provided at one end with a portion having a somewhat reduced cross section. At the point where the cross section changes, the tubular section, usually of metal, has a longitudinally sloping shoulder on its inner side.

The portion of reduced cross section fits closely around the next smaller section which is slidable within said reduced portion. The inner section may have an inner end portion of enlarged cross section which closely fits and is slidably supported by the unreduced portion of the outer section. At the point where the cross section of this inner member changes, there is usually a correspondingly sloping external shoulder. As the inner section is extended from the outer section these sloping shoulders engage each other and form a stop means preventing complete withdrawal of the inner section. These shoulders also exert a force upon each other which tends eventually to deform the respective tubular sections and thereby lessen the rigidity and stability of the tripod unit.

With these defects of the prior art constructions in view, it is accordingly one object of the present invention to provide an improved tripod of the telescoping leg type, with suitable means to limit the extension of the tripod legs without deformation of the leg sections and consequent loss of rigidity.

Another object is to provide a tripod, one section of which has a portion of enlarged or reduced cross section and a sloping shoulder at the point where said cross section changes, said shoulder having a tongue struck therefrom to cooperate with stop means on the other telescoping section.

A still further object of the invention is to provide such a tripod in which both the inner and outer tubular sections have correspondingly sloping shoulders at the point where their cross sections change, each of said shoulders being provided with a struck out tongue, and said tongues abutting each other to form a stop means and prevent the sloping shoulders from engaging each other.

Other objects and advantages of the present invention will be readily apparent from the following specification.

In the drawing which forms a part of this application:

Figure 1 is a perspective view of a tripod according to the present invention;

Figure 2 is an enlarged front elevation of a portion of a leg of the tripod shown in Figure 1, the view being taken of the joint between sections 12 and 13 of said leg;

Figure 3 is a side view taken partly in section along the line 3—3 of Figure 2;

Figure 4 is an enlarged sectional view of the sliding joint shown in Figure 3;

Figure 5 is a view, similar to Figure 4, illustrating the sliding joint in an intermediate stage of construction; and Figure 6 is a view, similar to Figure 4, of a modified form of improved stop means according to the present invention.

In order that those persons skilled in the art may fully understand the nature and scope of this invention, the following detailed description is given, with particular reference to the above mentioned drawing wherein like reference characters indicate like parts.

As shown in Figure 1 the tripod includes a head 10 to which are pivoted three extendable legs. These legs are constructed of telescoping tubular sections 11, 12, 13 and 14. Thus sections 12 are slidable within sections 11, sections 13 within sections 12, and sections 14 within sections 13. These tubular sections may of course have any given cross section. In other words they may be cylindrical, triangular, rectangular or of any related equivalent cross section. In the example shown in the drawing these sections have a hexagonal cross section as described in greater detail below. The lower ends of sections 14 are provided with suitable tips 15 which may be in the form of spikes, rubber caps or the like. Furthermore the tripod head 10 is provided with means for attachment to a camera or other device. In the figure the attaching means 16 is shown in the form of a threaded member or screw.

With reference to Figure 2 the telescoping tubular sections will now be described in greater detail. Figure 2 shows the joint between sections 12 and 13, but it is apparent that the same or an equivalent construction can be employed at each of the sliding joints. As shown in the figure the section 12 is hexagonal in cross section and includes the three front sides 17, 18 and 19 together with three corresponding rear sides not shown in the figure. The lower or outer end of section 12 is provided with a portion 20 which is of reduced or smaller cross section compared to the rest of the member. This reduction in cross section may be achieved by deforming inwardly one or more of the sides, 17, 18, etc., which form the tubular section. It is essential that at least one side be so deformed, and in the drawing all three of the front sides 17, 18 and 19 are reduced as at 20. While any suitable material may be used, the sections are usually made of aluminum or other metal. It is impractical and uneconomical to deform this material in a sharp right-angled bend at the point where the change in cross section takes place. Thus the walls of the section bend inwardly at this point in a smooth reverse curve which leaves a longitudinally sloping shoulder 21 on the inside of the section. (See Figure 4.)

The inner or lower section 13 has an external shape which fits closely and slidably within the reduced portion 20 of the upper section. Thus the reduced portion 20 supports the section 13 in a slidable manner.

Section 13 is correspondingly formed with a hexagonal cross section and three of the six sides of the section are shown at 22, 23 and 24 in Figure 2. The inner or upper end of this section 13 has a portion of enlarged cross section as shown at 25 (see Figures 3 and 4). This portion of enlarged cross section corresponds in external dimensions to the internal shape and size of the unreduced portion of the outer section 12. Thus the enlarged portion 25 is closely and slidably supported by said unreduced portion. By reason of the two points at which the sections 12 and 13 are slidably supported by each other, these sections are relatively rigid, so that the tripod does not wobble or shake when the legs are fully extended.

As shown in Figures 3 and 4 the inner section 13 also has a sloping shoulder 26 at the point where its cross section changes. Shoulder 26 is a longitudinally sloping external shoulder which would be adapted normally to engage the corresponding shoulder 21 of the outer section to form a stop means limiting the extension of the inner section from the outer section.

In order that the description up to this point may be understood more clearly reference is made to Figure 5 which shows a tripod construction similar to the present one insofar as it has been described. In Figure 5 the outer section 27 has a reduced portion 28 with an internal sloping shoulder 29 at the point where the cross section changes. Similarly inner section 30 has an end portion 31 of enlarged cross section fitting closely within the unreduced portion of section 27. Section 30 also has an external sloping shoulder 32 at the point where its cross section changes.

It will be apparent from Figure 5 that withdrawal of section 30 from section 27 (in a downward direction in the figure) will be limited by the engagement of shoulders 29 and 32. However, in prior art tripods embodying this form of construction, these shoulders 29 and 32 act against each other not only to limit the outward extension of the inner section, but also to deform the inner and outer sections slightly with a consequent loss of rigidity after a given period of time.

According to the present invention at least one of the sloping shoulders 21 and 26 (see Figure 4) is provided with a sheared portion or tongue struck from the shoulder itself. Thus in Figure 4 the tongue 33 is struck or sheared inwardly from the shoulder 21 of the outer section. The tongue extends toward the enlarged portion 25 of the inner section and it is thus apparent that tongue 33 is, in a sense, a longitudinal continuation of the reduced portion 20. Tongue 33 is cut or sheared so that its end face 35 will be substantially perpendicular to the direction of relative movement of the slidable sections as shown.

A corresponding tongue 34 may be struck or sheared outwardly from the shoulder 26 of the inner section. This tongue 34 extends longitudinally toward the other tongue 33 and thus tongue 34 is substantially a continuation of enlarged portion 25 of the inner section. Tongue 34 likewise has an end face 36 which is substantially perpendicular to the direction of movement of the slidable sections.

It is apparent from Figure 4 that the end faces 35 and 36 of tongues 33 and 34 abut each other and form a stop means, limiting the outward extension of the inner section before the sloping shoulders 21 and 26 can engage each other. We have found that the use of these tongues to prevent engagement of the sloping shoulders with each other avoids any deformation of the inner and outer sections. Thus the tripod maintains its original closely slidable fit even through a period of extended use, without substantial loss of rigidity at the sliding joints.

As shown in Figures 3 and 4 it may be advantageous in forming tongues 33 and 34 to remove a small portion of the material forming the respective sections as shown at 37 and 38. The removal of these portions of material facilitates the formation and shaping of the tongue members.

In Figure 6 an alternative form of the present invention is described. According to this form one of the sections remains substantially the same as in Figure 4, while the other section is provided with other stop means to cooperate with the struck out tongue. In Figure 6 the outer section has been left substantially the same as in Figure 4 and includes the portion 20 of reduced cross section and the sloping shoulder 21. Tongue 33 is struck inwardly from the sloping shoulder and is provided with a flat end face 35 substantially perpendicular to the direction of movement of the sliding section.

The inner section 13 is again provided with an enlarged end portion 25 and a sloping external shoulder 26 as in the construction of Figure 4. Instead of striking a tongue from shoulder 26, however, I have provided a cut-out or notched portion 39 one face 40 of which is parallel to the end face 35 of tongue 33. As shown in Figure 6 the notch 39 is preferably positioned at an end of the shoulder 26 nearest the tongue 33. Thus the flat surface of the notch cooperates with the surface 35 of the tongue to limit the outward extension of the inner section before the shoulders 21 and 26 can engage each other.

It will be apparent that any equivalent stop means can be used on one of the members to cooperate with a sheared portion or struck-out tongue on the other sliding section and limit the outward extension of the inner section before the sloping shoulder of either section engages the stop means on the other section.

As indicated in Figures 2 and 3 the inner section 13 may be provided with the usual form of spring latch 41 to hold the section in its extended position until the user depresses this latch member 41 in preparation for telescoping the tripod legs inside each other.

Since various equivalent forms of construction will be apparent to those persons skilled in the art, it is my intention that the present invention shall be interpreted as covering all modifications and equivalents within the scope and spirit of the attached claims.

While the invention is here shown for use in connection with tripods, it will be also apparent that the invention is adaptable for other uses such as in connection with any similar telescoping or relatively sliding members wherever it is desired to have a means to secure a positive predetermined stop.

Now therefore I claim:

1. A tripod having a head and a plurality of extendable legs attached to said head, each leg having at least two tubular sections one of which is slidable longitudinally within the other, the outer section including an end portion of reduced cross section, the inner section fitting closely within said reduced portion and being slidably carried thereby, said inner section having a portion of enlarged cross section fitting closely within the unreduced portion of the outer section and being slidably supported thereby, one of said sections having a longitudinally sloping shoulder at the point where its cross section changes, the other section having stop means to limit the extension of the sections with relation to each other, and a tongue struck from said sloping shoulder and engaged by said stop means for limiting said relative extension before said stop means can engage said sloping shoulder.

2. A tripod having a head and a plurality of extendable legs attached to said head, each leg having at least two tubular sections one of which is slidable longitudinally within the other, the outer section including an end portion of reduced cross section with a sloping internal shoulder at the point where said cross section changes, the inner section fitting closely within said reduced portion and being slidably carried thereby, said inner section having an end portion of enlarged cross section fitting closely within the unreduced portion of the outer section and being slidably carried thereby, said inner section having a correspondingly sloping external shoulder at the point where its cross section changes, a tongue struck from the sloping shoulder of one section and extending longitudinally toward the shoulder of the other section, and stop means on said other section engaging said tongue and limiting the extension of said inner section from the outer section before said sloping shoulders can engage each other.

3. A tripod having a head and a plurality of extendable legs attached to said head, each leg having at least two tubular sections one of which is slidable longitudinally within the other, the outer section including an end portion of reduced cross section with a sloping internal shoulder at the point where said cross section changes, the inner section fitting closely within said reduced portion and being slidably carried thereby, said inner section having an end portion of enlarged cross section fitting closely within the unreduced portion of the outer section and being slidably supported thereby, said inner section having a correspondingly sloping external shoulder at the point where its cross section changes, a tongue struck inwardly from the sloping internal shoulder of the outer section, a second tongue struck outwardly from the sloping external shoulder of the inner section, said tongues abutting each other and forming a stop limiting the extension of said inner section from the outer section before said sloping shoulders can engage each other.

4. A tripod having a head and a plurality of extendable legs attached to said head, each leg having at least two tubular sections one of which is slidable longitudinally within the other, the outer section including an end portion of reduced cross section with a sloping internal shoulder at the point where said cross section changes, the inner section fitting closely within said reduced portion and being slidably carried thereby, said inner section having an end portion of enlarged cross section fitting closely within the unreduced portion of the outer section and being slidably supported thereby, said inner section having a correspondingly sloping external shoulder at the point where its cross section changes, a first tongue struck inwardly from the sloping internal shoulder of the outer section and extending longitudinally toward said other shoulder as a continuation of said portion of reduced cross section, a second tongue struck outwardly from the sloping external shoulder of the inner section and extending longitudinally toward said first shoulder and tongue as a continuation of said portion of enlarged cross section, said tongues abutting each other and forming a stop limiting the extension of said inner section from the outer section before said sloping shoulders can engage each other.

5. A tripod having a head and a plurality of extendable legs attached to said head, each leg having at least two tubular sections one of which is slidable longitudinally within the other, the outer section including an end portion of reduced cross section with a sloping internal shoulder at the point where said cross section changes, the inner section fitting closely within said reduced portion and being slidably carried thereby, said inner section having an end portion of enlarged cross section fitting closely within the unreduced portion of the outer section and being slidably supported thereby, said inner section having a correspondingly sloping external shoulder at the point where its cross section changes, a first tongue struck inwardly from the sloping internal shoulder of the outer section and extending longitudinally toward said other shoulder as a continuation of said portion of reduced cross section, a second tongue struck outwardly from the sloping external shoulder of the inner section and extending longitudinally toward said first shoulder and tongue as a continuation of said portion of enlarged cross section, said tongues having end surfaces substantially perpendicular to the direction of relative movement of the sections, said end surfaces abutting each other and forming a stop limiting the extension of said inner section from the outer section before said sloping shoulders can engage each other.

WILLIS HENRY MACHIN.